United States Patent Office 3,524,855
Patented Aug. 18, 1970

3,524,855
11-AMINOALKYL-DIBENZO[b,f]OXEPIN-10(11H)-ONE
Walter Riehen Schindler and Hans Blattner, Basel, Switzerland, assignors to Geigy Chemical Corporation, Greenburgh, N.Y., a corporation of Delaware
No Drawing. Original application Dec. 3, 1964, Ser. No. 415,820. Divided and this application Jan. 3, 1968, Ser. No. 722,812
Claims priority, application Switzerland, Dec. 5, 1963, 14,908/63; Apr. 23, 1964, 5,284/64
Int. Cl. C07d 9/00
U.S. Cl. 260—268                    10 Claims

ABSTRACT OF THE DISCLOSURE 11-aminoalkyl-dibenzo[b,f]oxepin-10(11H)-ones have stimulating effect on the central nervous system and anticholinergic effects. They are prepared by alkylation of the corresponding 11-unsubstituted compounds.

CROSS REFERENCE

This is a division of copending application, Ser. No. 415,820 filed Dec. 3, 1964, now U.S. Pat. No. 3,391,160.

DETAILED DESCRIPTION

The present invention concerns new heterocyclic amines and more in particular, in a first aspect new thiepin derivatives and processes for their production.

According to its first aspect, this invention relates to compounds of the Formula I (in which the carbon atoms are numbered according to Chemical Abstracts)

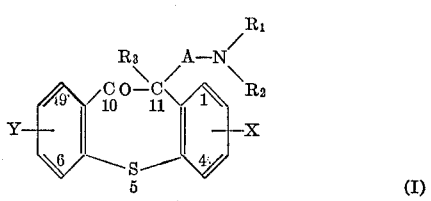

wherein:
X and Y represent hydrogen, halogen up to atomic number 35 inclusive, lower alkyl, lower alkoxy or lower alkylthio,
A represents a straight- or branched-chain alkylene radical having from 2 to 5 carbon atoms,
$R_1$ represents hydrogen or lower alkyl,
$R_2$ represents lower alkyl, or $R_1$ and $R_2$ together with the nitrogen to which they are attached represent a saturated heterocyclic radical having from 5 to 7 ring members, one of which ring members is selected from the group consisting of methylene and lower alkylimino, the remaining ring members being each methylene; and
$R_3$ represents hydrogen or methyl.

It has now been found that such compounds and their pharmaceutically acceptable salts with inorganic and organic acids, have a stimulating effect on the central nervous system of mammals and corresponding pharmacological properties, such as enhancement of the action of amphetamine and antagonism to the action of reserpine, tetrabenazine, and chlorpromazine, which renders them useful as mood elevating agents, for example in the treatment of mental disorders involving states of depression. These compounds are practically free from vegetative side effects as indicated by their substantial freedom from anticholinergic activity. These agents are administered orally or, in the form of aqueous solutions of their salts, also parenterally. If desired, they can also be combined with other pharmaceuticals.

In the compounds of the Formula I, X and Y can be in the 1-, 2-, 3- or 4-positions or in the 6-, 7-, 8- or 9-position, the 2- and 8-position being preferred. As lower alkyl radicals they represent, for example, the methyl, ethyl, n-propyl, isopropyl, n-butyl or tert. butyl group. As lower alkoxy radicals they represent, for example, the methoxy, ethoxy, n-propoxy, isopropoxy, n-butoxy or secondary butoxy group, and as alkylthio radicals they represent, e.g. the methylthio, ethylthio, n-propylthio, isopropylthio, n-butylthio or secondary butylthio group. A is, for example, the ethylene, 1-methylethylene, 2-methylethylene, trimethylene, 1-methyltrimethylene, 2-methyltrimethylene or 2-ethyltrimethylene radical.

$R_1$ and $R_2$ represent, for example, the methyl, ethyl, n-propyl, isopropyl or n-butyl radical. If $R_1$ and $R_2$ form a heterocyclic radical with the nitrogen atom then this is, e.g. the 1-pyrrolidinyl, piperidino, hexamethyleneimino, 4-methyl-1-piperazinyl or 4-methyl-1-homopiperazinyl radical.

To produce the new compounds of the Formula I, a compound of the formula

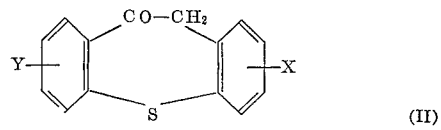

wherein X and Y have the meanings given in Formula I, is condensed in the presence of a basic condensing agent with a reactive ester of an amino alcohol of the general Formula III

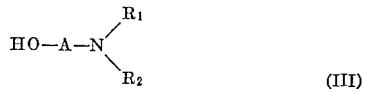

wherein A, $R_1$, and $R_2$ have the meanings given in Formula I. Suitable condensing agents are, in particular, sodium amide, phenyl sodium, lithium amide, potassium amide, sodium, potassium, lithium, butyl lithium, phenyl lithium, sodium or lithium hydride. The reaction can be performed in the presence or absence of an inert organic solvent such as benzene, toluene, xylene, dimethyl formamide or dioxan.

Of the starting materials of the general Formula II used according to the invention, dibenzo[b,f]thienpin-10(11H)-one is known. 2-chloro- and 8-chloro-dibenzo [b,f]thiepin-10(11H)-one are produced in the same manner. The latter is produced starting from the potassium salt of 2,5-dichlorobenzoic acid, this is condensed with thiophenol sodium and the condensation product is converted into the free 3-chloro-6-phenylthiobenzoic acid, M.P. 143–153°, from which the ethyl ester (B.P.$_{0.02}$ 150°) is produced. This intermediate product as well as the corresponding known starting material for 2-chloro-dibenzo[b,f]thiepin-10(11H)-one, o-(p'-chlorophenylthio)-benzoic acid ethyl ester or also the corresponding free carboxylic acids, are reduced with lithium aluminum hydride to form the 3-chloro-6-phenylthio benzyl alcohol, M.P. 52–54°, or o-(p'-chlorophenylthio)-benzyl alcohol, B.P.$_{0.05}$ 155°, and then these compounds are converted with 48% hydrobromic acid into 2-bromomethyl-4-chlorodiphenyl sulfide, B.P.$_{0.01}$ 135°, or into 2-bromomethyl-4'-chlorodiphenyl sulfide, M.P. 53°. Potassium cyanide in 95% ethanol, with the bromine compounds, yields 3-chloro-6-phenylthiophenyl acetonitrile, B.P.$_{0.05}$ 145°, or o-(p'-chlorophenylthio)-phenyl acetonitrile which are hydrolyzed to form 3-chloro-6-phenylthiophenyl acetic acid, M.P. 115–118°, or o-(p'-chlorophenylthio)-phenyl acetic acid, M.P. 97–100°. The carboxylic acids obtained can be cyclized with polyphosphoric acid to form 8-chloro- or 2-chlorodibenzo[b,f]-thiepin-10(11H)-one.

2 - chloro-8-methyl-dibenzo[b,f]thiepin-10(11H)-one, M.P. 114–115°, is prepared analogously from 5-chloro-2-(p-tolylthio)-benzoic acid, M.P. 169–171° via the intermediates (a) ethyl 5-chloro-2-(p-tolylthio)-benzoate, M.P. 67–69°, (b) 5-chloro-2-(p-tolylthio)-benzyl alcohol, (c) -benzyl bromide, M.P. 40–41°, (d) -benzyl cyanide, and (e) 5-chloro-2-(p-tolylthio)-phenylacetic acid, M.P. 127–129°.

The halides are used in particular as reactive esters of amino alcohols of the Formula III; individually can be named: 2-dimethylamino ethyl chloride, 2-diethylamino ethyl chloride, 2-methylethylamino ethyl chloride, 2-dimethylamino-propyl chloride, 2-dimethylamino-1-methyl ethyl chloride, 3-dimethylamino-propyl chloride, 3-dimethylamino butyl chloride, 4-dimethylamino butyl chloride, 3-dimethylamino-2-methyl-propyl chloride, 2-(di-n-propylamino)-ethyl chloride, 2-(methylisopropylamino)-ethyl chloride, 1-(2'-chloroethyl)-pyrrolidine, 1-(3' - chloropropyl)-pyrrolidine, 1-(2'-chloroethyl)-piperidine, 1-(3'-chloropropyl)-piperidine, 1-(2'-chloroethyl)-4-methyl piperazine, 1-(3'-chloropropyl)-4-methyl piperazine and 1-(3'-chloropropyl)-4-methyl homopiperazine, as well as the corresponding bromides and iodides.

The new compounds of the Formula I form salts, most of which are water soluble, with inorganic and organic acids such as hydrochloric acid, hydromic acid, sulfuric acid, phosphoric acid, methane sulfonic acid, ethane disulfonic acid, β-hydroxyethane sulfonic acid, acetic acid, lactic acid, oxalic acid, succinic acid, fumaric acid, maleic acid, malic acid, tartaric acid, citric acid, benzoic acid, salicylic acid, phenyl acetic acid and mandelic acid.

A second aspect of the present invention concerns new oxepin derivatives and processes for the production thereof.

More particularly, this aspect relates to compounds of the formula

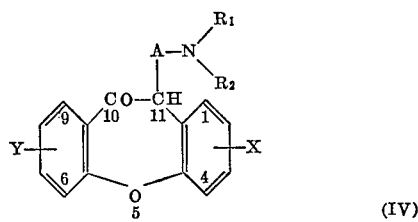

(IV)

wherein:

A, X, and Y have the same meanings as in Formula I, each of $R_1$ and $R_2$ represent lower alkyl, or $R_1$ and $R_2$ together with the adjacent nitrogen atom, optionally with a lower alkylimino group as ring member, represent a saturated heterocyclic radical having 5–7 ring members, and their salts with inorganic and organic acids.

It has now been found that the compounds of Formula IV and their salts with inorganic and organic acids have similar pharmaceutical activities and therapeutic utility as the compounds of Formula I, with the exception of those compounds of Formula IV in which each of $R_1$ and $R_2$ is ethyl and those in which $R_1$ and $R_2$ taken together with the nitrogen atom to which they are linked form a pyrrolidino or piperidino ring, which group of compounds are distinguished from the corresponding ones of Formula IV and from those of Formula I by possessing anticholinergic activity rather than antagonism to reserpine and tetrabenzine, wherefore they are useful especially as spasmolytics.

The compounds of Formula IV are administered orally, and the aqueous solutions of their salts can be applied parenterally. They can also be combined, if desired, with other pharmaceuticals.

Similarly as in the compounds of Formula I, X and Y in the compounds of Formula IV can be in the 1-, 2-, 3- or 4- or in the 6-, 7-, 8-, or 9-position respectively. The 2- and 8-positions are preferred. For example, as lower alkyl radicals they are the methyl, ethyl, n-propyl, isopropyl, n-butyl or tert. butyl group, as lower alkoxy radicals they are the methoxy, ethoxy, n-propoxy, isopropoxy, n-butoxy or the secondary butoxy group and, as alkylthio radicals, they are the methylthio, ethylthio, n-propylthio, isopropylthio, n-butylthio or the secondary butylthio group. A is, for example, the ethylene, 1-methylethylene, 2-methylethylene, trimethylene, 1-methyltrimethylene, 2-methyltrimethylene or 2-ethyl-trimethylene radical. $R_1$ and $R_2$ represent, for example, the methyl, ethyl, n-propyl, isopropyl or the n-butyl radical. If $R_1$ and $R_2$ form a heterocyclic radical with the nitrogen atom this is, e.g. the 1-pyrrolidinyl, piperidino, hexamethyleneimino, 4-methyl-1-piperazinyl or the 4-methyl-1-homopiperazinyl radical.

To produce the new compounds of Formula IV, compounds of the formula

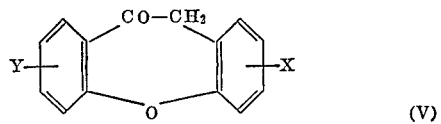

(V)

wherein X and Y have the meanings given in Formula IV are reacted in the presence of a basic condensing agent with a reactive ester of an amino alcohol of the formula

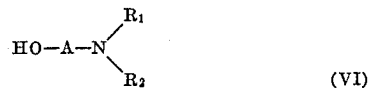

(VI)

wherein A, $R_1$ and $R_2$ have the meanings given in Formula IV. Particularly suitable condensing agents are sodium amide, phenyl sodium, lithium amide, potassium amide, sodium, potassium, lithium, butyl lithium, phenyl lithium, sodium or lithium hydride. The reaction can be performed in the presence or absence of an inert organic solvent such as benzene, toluene, xylene, dimethyl formamide or dioxan.

Of the starting materials of Formula V used according to the invention, dibenz[b,f]oxepin-10(11H)-one and 4-methoxy-dibenz[b,f]oxepin-10(11H)-one are known. Other starting materials substituted in the benzene rings are produced analogously.

8-chloro-dibenz[b,f]oxepin-10(11H)-one, M.P. 84°, is prepared analogously from 2-(4'-chlorophenoxy)-benzoic acid, M.P. 114–116°, via the intermediates (a) ethyl 2-(4'-chlorophenoxy)-benzoate, B.P. 134°/0.01 torr, (b) 2-(4'-chlorophenoxy)-benzyl alcohol, B.P. 140°/0.04 torr, (c) -benzyl bromide, (d) -benzyl cyanide, B.P. 142°/0.04 torr, and (e) 2-(4'-chlorophenoxy)-phenylacetic acid, M.P. 115°.

2-methoxy-dibenz[b,f]oxepin-10(11H)-one, M.P. 78°, is prepared analogously from 5-methoxy-2-phenoxybenzoic acid, M.P. 150° (which in turn results from the condensation of 2-chloro-5-methoxybenzoic acid, M.P. 173°, with sodium phenolate) via the intermediates (a) ethyl 5-methoxy-2-phenoxybenzoate, M.P. 50°, (b) 5-methoxy-2-phenoxy-benzyl alcohol, M.P. 58°, (c) -benzyl bromide, M.P. 40°, (d) -benzyl cyanide, M.P. 49°, and (e) 5-methoxy-2-phenoxyphenylacetic acid, M.P. 92–95°.

8-chloro - 2 - methyl-dibenz[b,f]oxepin-10(11H)-one, M.P. 106–108°, is prepared in an analogous manner from 5-chloro-2-(p-tolyloxy)-benzoic acid, M.P. 137–139°, via the intermediates (a) ethyl 5-chloro-2-(p-tolyloxy)-benzoate, B.P. 136–140°, (b) 5-chloro-2-(p-tolyloxy)-benzyl alcohol, (c) -benzyl bromide, (d) -benzyl cyanide, B.P. 160–200°/0.05 torr, and (e) 5-chloro-2-(p-tolyloxy)-phenylacetic acid, M.P. 98–100°.

The halides, for example, are used as reactive esters of amino alcohol of the Formula VI. Individually can be named: 2-dimethylamino-ethyl chloride, 2-diethylamino-ethyl chloride 2-methylethylamino-ethyl chloride, 2-dimethylamino-propyl chloride, 2-dimethylamino-1-methyl-ethyl chloride, 3-dimethylamino-propyl chloride, 3-dimethylamino-butyl chloride, 4-dimethylamino-butyl chloride, 3-dimethylamino-2-methyl-propyl chloride, 2-dipropylamino-ethyl chloride, 2-methylisopropylamino-ethyl chloride, 1-(2'-chloroethyl)-pyrrolidine, 1-(3'-chloropropyl)-pyrrolidine, 1 - (2' - chloroethyl)-piperidine, 1-(3'-chloropropyl)-piperidine, 1 - (2'-chloroethyl)-4-methylpiperazine, 1-(3'-chloropropyl)-4-methyl-piperazine and 1-(3'-chloropropyl)-4-methyl-homopiperazine as well as the corresponding bromides and iodides.

As mentioned above, the new compounds of Formulas I and IV and their pharmaceutically acceptable salts are administered perorally, rectally and parenterally. The daily dosages of the free bases or of non-toxic salts thereof vary between 10 and about 700 mg. for adult patients. Suitable dosage units such as dragées (sugar coated tablets), tablets, suppositories or ampoules, preferably contain 5 to 100 mg., and especially 25 mg., of an active substance according to the invention or of a non-toxic salt thereof.

By pharmaceutically acceptable salts of the bases used according to the invention, salts with those acids are meant the acid components of which in the dosages used do not have any toxic effects. It is also of advantage if the salts to be used crystallize well and are not or are only slightly hygroscopic.

Examples of pharmaceutically acceptable salts of the compounds of Formular IV are the salts with hydrochloric acid, hydrobromic acid, sulfuric acid, phosphoric acid, methane sulfonic acid, ethane disulfonic acid, $\beta$-hydroxyethane sulfonic acid, acetic acid, lactic acid, oxalic acid, succinic acid, fumaric acid, maleic acid, malic acid, tartaric acid, citric acid, benzoic acid, salicylic acid, phenyl-acetic acid and mandelic acid. These can be used instead of the free bases as active ingredients.

Dosage units for peroral application contain as active substance preferably between 1 and 90% of a compound of the Formula I or of a pharmaceutically acceptable salt thereof. They are produced by combining the active substance with, for example, solid, pulverulent carriers such as lactose, saccharose, sorbitol, mannitol; starches such as potato starch, corn starch or amylopectin, also laminaria powder or citrus pulp powder; cellulose derivatives of gelatin, optionally with the addition of lubricants such as magnesium or calcium stearate or polyethylene glycols (carbowaxes) of suitable molecular weights to form tablets or dragée cores. The latter are coated, for example, with concentrated sugar solutions which can also contain, e.g. gum arabic, talcum and/or titanium dioxide, or with a lacquer dissolved in easily volatile organic solvents or mixtures of solvents. Dyestuffs can be added to these coatings, e.g. to distinguish between different dosages of active substance.

Examples of dosage units for rectal application are, e.g. suppositories which consist of a combination of an active substance or suitable salt thereof with a neutral fatty foundation, or also gelatine rectal capsules which contain a combination of the active substance or a suitable salt thereof with polyethylene glycols (carbowaxes) of suitable molecular weight.

Ampoules for parenteral, particularly intramuscular, administration preferably contain a water soluble salt of an active substance in a concentration of preferably 0.5–5%, in aqueous solution, optionally together with suitable stabilizing agents and buffer substances.

The following methods describe the production of tablets and dragées:

(a) 250 g. of 11-(3' - dimethylamino-propyl) - dibenz [b,f]-oxepin-10(11H)-one hydrochloride are mixed with 175.80 g. of lactose and 169.70 g. of potato starch. The mixture is moistened with an alcoholic solution of 10 g. of stearic acid and then granulated through a sieve. After drying, 160 g. of potato starch, 200 g. of talcum, 250 g. of magnesium stearate and 32 g. of colloidal silicium dioxide are mixed in and the mixture is pressed into 10,000 tablets each weighing 100 mg. and containing 25 mg. of active substance (hydrochloride). If desired, the tablets can be grooved for better adaptation of the dosage.

(b) A granulate is produced from 250 g. of 11(3'-dimethylamino-propyl)-dibenz[b,f]oxepin-10(11H) - one hydrochloride, 175.90 g. of lactose and the alcoholic solution of 10 g. of stearic acid. After drying, 56.60 g. of colloidal silicium dioxide, 165 g. of talcum, 20 g. of potato starch and 2.50 g. of magnesium stearate are mixed in and the mixture is pressed into 10,000 dragée cores. These are then coated with a concentrated syrup consisting of 502.28 g. of crystallized saccharose, 6 g. of shellack, 10 g. of gum arabic, 0.22 g. of dyestuff and 1.5 g. of titanium dioxide and dried. The dragées obtained each weigh 120 mg. and contain 25 mg. of active substance.

The following non-limitative examples further illustrate the production of the new compounds of Formula I. The temperatures are given in degrees centigrade.

EXAMPLE 1

(a) 45.2 g. of dibenzo[b,f]thiepin-10(11H)-one are dissolved in 250 ml. of abs. benzene and a suspension of 8 g. of sodium amide in 24 ml. of abs. toluene is added. The mixture is refluxed for 2 hours, then cooled to 50°, 27 g. of freshly distilled 3-dimethylamino-propyl chloride are added and the whole is refluxed for 20 hours. The reaction mixture is cooled to 20°, water is added, the organic phase is separated and extracted with 2 N hydrochloric acid. The aqueous extract is made alkaline with concentrated sodium hydroxide solution, extracted with ethyl ether, the ether extract is washed with water, dried over potassium carbonate and concentrated in vacuo. To cleave the basic enol ether formed as side product, the residue is heated with 250 ml. of 2 N hydrochloric acid for 30 minutes at 80–90° and then the reaction solution is cooled with ice whereupon the neutral cleavage product, dizenzo [b,f]thiepin - 10(11H) - one, crystallizes out. The crystals are filtered off, washed with 2 N hydrochloric acid and the combined acid filtrates are made alkaline with concentrated sodium hydroxide solution. The alkaline phase is extracted with ethyl ether, the ethereal solution is washed with water, dried over potassium carbonate and concentrated. On distilling the residue in vacuo, 11-(3' - dimethylamino - propyl) - dibenzo[b,f]thiepin - 10 with 500 ml. each of 2 N hydrochloric acid. The aqueous converted into the hydrochloride with ethanolic hydrochloric acid, M.P. 122–124°.

(b) The following are obtained from dibenzo[b,f]-thiepin-10(11H)-one analogously to process (a): with 2-dimethylamino-ethyl chloride: 11-(2'-dimethylamino-ethyl)-dibenzo[b,f]thiepin - 10(11H) - one, $B.P._{0.005}$ 160–161°, hydrochloride M.P. 206–208° from abs. ethanol; with 3-diethylamino-propyl chloride: 11-(3'-diethylamino-propyl)-dibenzo[b,f]thiepin-10(11H)-one, $B.P._{0.01}$ 187–189°, hydrochloride, M.P. 197–200° from abs. ethanol; with 3-dimethylamino-2-methyl propyl chloride: 11-(3'-dimethylamino-2'-methylpropyl)-dibenzo[b,f]thiepin - 10 (11H)-one, $B.P._{0.005}$ 181–182°, M.P.85–86° from petroleum ether, and with 3-piperidino propyl chloride: 11-(3'-piperidino-propyl) - dibenzo[b,f]thiepin - 10(11H) - one $B.P._{0.01}$ 193–196°, hydrochloride, M.P. 203–206° from abs. ethanol.

(c) 8 - chloro - dibenzo[b,f]thiepin - 10(11H) - one, M.P. 141°, is obtained analogously to dibenzo[b,f]thiepin-10(11H)-one. This is converted according to process (a), with 2-dimethylamino-ethyl chloride, into 8-chloro-11-(2'-dimethylamino-ethyl)-dibenzo-[b,f]thiepin-10(11H) - one (M.P. 108–109° from ethyl ether/petroleum ether), and with 3-dimethylamino-propyl chloride it is converted into 8 - chloro-11-(3'-dimethyl-aminopropyl)-dibenzo[b,f]

thiepin-10(11H)-one, B.P.$_{0.01}$ 180–183°, M.P. 62–63° from pentane.

(d) The following are further obtained analogously to process (a): 3 - chloro - 11-(2'-dimethylamino-ethyl)-dibenzo[b,f]thiepin-10(11H)-one, M.P. 91–92°; 3-chloro-11 - (3' - dimethylaminopropyl) - dibenzo[b,f]thiepin-10 (11H)-one, M.P. 83–84°; and 2-chloro-8-methyl-11(3'-dimethylaminopropyl)-dibenzo[b,f]thiepin-10(11H)- one- B.P.$_{0.002}$ 197–200°, hydrochloride M.P. 168–172°.

EXAMPLE 2

(a) To the boiling solution of 240 g. of 11-methyl-dibenzo[b,f]thiepin-10(11H)-one in 2400 ml. of anhydrous benzene there is added dropwise a suspension of 25 g. of lithium amide in anhydrous benzene. Reflux is maintained after completion of addition; after 2 hours a solution of 165 g. of 3-dimethylaminopropyl chloride in 150 ml. of absolute benzene is added dropwise and reflux is maintained for another 16 hours. The reaction mixture is then cooled to room temperature and water is added. The benzene phase is separated and extracted 4 times with 500 ml. each of 2 N hydrochloric acid. The aqueous acid extracts are combined, 400 ml. of concentrated hydrochloric acid are added thereto, and the whole is warmed for 2 hours on the steam bath. Upon cooling to room temperature, a crystalline precipitate consisting of the starting ketone has deposited, which is filtered off. The clear acid filtrate is basified and the resultant amorphous base is extracted into ether. The ether phase is washed with water, dried over potassium carbonate and evaporated to dryness, leaving a syrupy residue consisting of 11-(3' - dimethylaminopropyl) - 11-methyl - dibenzo[b,f] thiepin-10(11H)-one which is distilled in high vacuum: B.P. 165–170°/0.002 torr. The hydrochloride has M.P. 185–190° (from isopropanol/either).

(b) Working as above, but using 145 g. of 2-dimethyl-amino-ethyl chloride in 150 ml. of absolute benzene, there is obtained 11 - (2'-dimethylamino-ethyl)-11-methyl-dibenzo[b,f]thiepin - 10(11H) - one, B.P. 160–163°/0.01 torr: hydrochloride salt M.P. 170–174° (from isopropanol).

EXAMPLE 3

(a) To the solution of 11 g. of cyanogen bromide in 100 ml. of anhydrous benzene there is added at room temperature, dropwise and over the period of 30 minutes a solution of 29 g. of 11-(3'-dimethylaminopropyl)-dibenzo[b,f]thiepin-10(11H)-one. Subsequently, the mixture is heated under reflux for 1 hour, then cooled to room temperature. Water is added and the phases are separated. The benzene phase is washed with water, repeatedly with 2 N hydrochloric acid, and again with water. Then it is dried over sodium sulfate and evaporated to dryness. The residue crystallizes from benzene/petroleum ether to give 11-[3'-(N-cyano-N-methylaminopropyl)]-dibenzo[b,f]thiepin-10(11H)-one, M.P. 104–106°.

(b) Twenty grams of the above cyanamide are suspended in 200 ml. of 0.5 N hydrochloric acid and warmed to 55–60° for 10 hours, when solution is complete. The clear aqueous solution is cooled, basified with concentrated ammonia and extracted with ether. The ether phase is washed with water, dried over sodium sulfate and evaporated to dryness leaving 11-(3'-methylaminopropyl)-dibenzo[b,f]thiepin-10(11H)-one.

In an analogous manner as described in Example 3, there are obtained: (a) from 11-(2'-dimethylaminoethyl)-dibenzo[b,f]thiepin-10(11H)-one as final product 11-(2'-methylaminoethyl) - dibenzo[b,f]thiepin - 10(11H) - one; and (b) from the 8-chloro-11-(3'-dimethylaminopropyl)-dibenzo[b,f]thiepin-10(11H)-one as final product 8-chloro - 11 - (3' - methylaminopropyl)-dibenzo[b,f]thiepin-10(11H)-one; and (c) from 11-(2'-dimethylaminoethyl)-11 - methyl - dibenzo[b,f]thiepin - 10(11H) - one as final product 11 - (2'-methylaminoethyl)-11-methyl - dibenzo-[b,f]thiepin-10(11H)-one.

EXAMPLE 4

(a) 210 g. of dibenz[b,f]oxepin-10(11H)-one are dissolved in 1.70 litres of abs. benzene, a suspension of 23 g. of lithium amide in 69 ml. of abs. toluene is added to the solution and the whole is refluxed for 2 hours. After cooling the reaction mixture to 50°, 152 g. of freshly distilled 3-dimethylamino-propyl chloride are added and the whole is refluxed for another 20 hours. The mixture is then cooled to 20°, water is added, the organic phase is removed and extracted with 2 N hydrochloric acid. The hydrochloric acid extracts are heated for 30 minutes at 80–90° in order to split the basic enol ether formed as side product. After cooling the reaction mixture to 20°, the neutral cleavage product, dibenz[b,f]oxepin-10(11H)-one, crystallizes out. The crystals are filtered off, washed with 2 N hydrochloric acid and the combined acid filtrates are made alkaline with concentrated sodium hydroxide solution. The alkaline phase is extracted with diethyl ether, the ethereal solution is washed with water, dried over potassium carbonate and concentrated. Distillation of the residue under high vacuum yields 11-(3'-dimethylaminopropyl)-dibenzo[b,f]oxepin-10(11H)-one, BP. 166–169°/0.01 torr. The base is converted with ethanolic hydrochloric acid into the hydrochloride, M.P. 191–195° recrystallized from isopropanol.

(b) The following compounds are obtained from dibenz[b,f]oxepin-10(11H)-one analogously to process (a):

(b$^1$) With 2 - dimethylamino-ethyl chloride: 11-(2'-dimethylamino-ethyl) - dibenz[b,f]oxepin - 10(11H) - one, B.P. 147–151°/0.002 torr, hydrochloride M.P. 175–177° from isopropanol/diethyl ether, (b$^2$) With 3-diethylamino-propyl chloride 11-(3'-diethylaminopropyl)-dibenz[b,f]oxepin-10(11H)-one, B.P. 155–157°/0.002 torr, hydrochloride M.P. 131–132° from acetone, (b$^3$) With 3-piperidino-propyl chloride: 11-(3'-piperidinopropyl)-dibenz[b,f]oxepin-10(11H)-one, B.P. 176–180°/0.004 torr, hydrochloride, M.P. 96–99° from acetone, and (b$^4$) With 1-(3'-chloropropyl) - 4 - methyl-piperazine: 11 - [3' - (4'' - methyl - 1'' - piperazinyl) - propyl] - dibenz[b,f]oxepin-10(11H)-one, M.P. 123–125° from benzine, dihydrochloride, M.P. 250–255° from ethanol.

EXAMPLE 5

Following the procedure given in Example 4a and using as reactants 2-dimethylaminoethyl chloride and (a) 8-chloro-[dibenz[b,f]oxepin - 10(11H) - one] or (b) 2-methoxy-[dibenz[b,f]oxepin-10(11H)-one] there are obtained as final products: (a) 8-chloro-11-(2'-dimethylaminoethyl) - [dibenz[b,f]oxepin-10(11H)-one], hydrochloride; and (b) 11-(2'-dimethylaminoethyl)-2-methoxy-[dibenz[b,f]oxepin - 10(11H) - one], hydrochloride, respectively.

Using as reactants 3-dimethylaminopropyl chloride and (c) 8-chloro-[dibenz[b,f]oxepin-10(11H)-one]; or (d) 2-methoxy-[dibenz[b,f]oxepin-10(11H)-one]; or (e) 8-chloro-2-methyl-[dibenz[b,f]oxepin-10(11H) - one] there are obtained as final products; (c) 8-chloro-11-(3'-dimethylaminopropyl)-[dibenz[b,f]oxepin-10(11H) - one], hydrochloride; (d) 11 - (3'-dimethylaminopropyl)-2-methoxy[dibenz[b,f]oxepin-10(11H) - one], hydrochloride; and (e) 8-chloro-2-methyl-11-(3'-dimethylaminopropyl)-[dibenz[b,f]oxepin-10(11H)-one], hydrochloride, respectively.

We claim:
1. 11 - (3' - dimethylaminopropyl) - dibenz[b,f]oxepin-10(11H)-one.
2. A nontoxic pharmaceutically acceptable acid addition salt of the compound of claim 1.
3. 11 - (2' - dimethylamino - ethyl) - dibenz[b,f]oxepin-10(11H)-one.
4. A nontoxic pharmaceutically acceptable acid addition salt of the compound of claim 3.

5. 11 - (3' - diethylaminopropyl) - dibenz[b,f]oxepin-10(11H)-one.

6. A nontoxic pharmaceutically acceptable acid addition salt of the compound of claim 5.

7. 11 - (3' - piperidinopropyl) - dibenz[b,f]oxepin-10(11H)-one.

8. A nontoxic pharmaceutically acceptable acid addition salt of the compound of claim 7.

9. 11 - [3' - (4'' - methyl - 1'' - piperazinyl) - propyl]-dibenz[b,f]oxepin-10(11H)-one.

10. A nontoxic pharmaceutically acceptable acid addition salt of the compound of claim 9.

References Cited

UNITED STATES PATENTS 3,100,207    8/1963    Zirkle.

HENRY R. JILES, Primary Examiner

S. D. WINTERS, Assistant Examiner

U.S. Cl. X.R.

260—294.7, 327, 333

PO-1050
(5/69)

UNITED STATES PATENT OFFICE
CERTIFICATE OF CORRECTION

Patent No. 3,524,855          Dated    Aug. 18, 1970

Inventor(s)    Walter Schindler and Hans Blattner

It is certified that error appears in the above-identified patent and that said Letters Patent are hereby corrected as shown below:

In column 1, the inventor should appear as --Walter Schindler, Riehen -- instead of "Walter Riehen Schindler"

In column 2, line 48 "thienpin" should be --thiepin--.

Column 6, line 50 should be omitted and in its place should appear --(11H)-one is obtained. $B.P._{0.005}$ 165-168°. The base is --

In column 7, line 35 "either" should be --ether--.

SIGNED AND
SEALED
JAN 5 1971

(SEAL)
Attest:

Edward M. Fletcher, Jr.
Attesting Officer

WILLIAM E. SCHUYLER, JR.
Commissioner of Patents